United States Patent [19]

Lewis et al.

[11] 4,176,142

[45] Nov. 27, 1979

[54] POWDER COATING COMPOSITION

[75] Inventors: Robert B. Lewis, Lower Makefield Township, Bucks County, Pa.; Terri A. Giversen, Delaware Township, Hunterdon County, N.J.

[73] Assignee: Western Electric Company, Inc., New York, N.Y.

[21] Appl. No.: 908,592

[22] Filed: May 22, 1978

[51] Int. Cl.² .............................................. C08L 63/00
[52] U.S. Cl. .................................. 525/336; 525/375; 525/348; 525/342
[58] Field of Search ............................ 260/836, 837 R

[56] References Cited

U.S. PATENT DOCUMENTS

| | | | |
|---|---|---|---|
| 3,254,282 | 5/1966 | West | 317/258 |
| 3,324,198 | 6/1967 | Gruver | 260/836 |
| 3,329,652 | 7/1967 | Christie | 260/47 |
| 3,338,863 | 8/1967 | Haag | 260/37 |
| 3,549,592 | 12/1970 | Godfrey et al. | 260/47 |
| 3,670,091 | 6/1972 | Frantz et al. | 174/52 PE |
| 3,756,984 | 9/1973 | Klarem et al. | 260/47 EC |
| 3,819,747 | 6/1974 | Bertram et al. | 260/830 TW |
| 3,868,613 | 2/1975 | Rogers | 336/206 |
| 3,896,082 | 7/1975 | Rensman et al. | 260/47 EN |
| 3,965,280 | 6/1976 | Ceyezeriat | 427/126 |
| 4,001,655 | 1/1977 | Voyles | 317/230 |
| 4,013,612 | 3/1977 | Tamura et al. | 260/37 EP |
| 4,018,847 | 4/1977 | Messerly | 260/836 |
| 4,025,578 | 5/1977 | Siebert | 260/837 R |
| 4,055,541 | 10/1977 | Riew | 260/836 |
| 4,088,708 | 5/1978 | Riew | 260/836 |
| 4,107,116 | 8/1978 | Riew | 260/837 R |
| 4,129,670 | 12/1978 | Riew | 260/837 R |

*Primary Examiner*—Paul Lieberman
*Attorney, Agent, or Firm*—Joel F. Spivak

[57] ABSTRACT

A powder coating composition is disclosed. The composition comprises at least one 1, 2 epoxy compound combined with a functionally terminated elastomer and a curing agent mixture. The curing agent mixture comprises an imidazoline derivative combined with an adduct of (a) a polyhydroxyl compound and (b) a diglycidyl ether of the polyhydroxyl compound, where reactant (b) is present in a less than equimolar amount to reactant (a).

12 Claims, No Drawings

POWDER COATING COMPOSITION

BACKGROUND OF THE INVENTION

1. Field of the Invention

This invention relates to a powder coating composition and more particularly, to a powder coating composition comprising an epoxy resin.

2. Discussion of the Prior Art

Many electrical devices require some type of external protective means to help protect fragile and sensitive electrical components from harmful mechanical shock and from detrimental effects of an external atmosphere, such as the effects of moisture and other atmospheric contaminants, which may adversely affect the electrical characteristics of such devices. A protective means such as an exterior continuous protective coating layer composed of a suitable resin, either a thermosetting or thermoplastic resin, helps protect such electrical devices from the named effects. A continuous resin protective coating layer is advantageous because, typically, such a layer is electrically insulative and has good resistance to mechanical shock due to its impact strength, and it is able to provide, under many operating conditions, suitable protection from contaminants that may be present in the atmosphere.

While such a continuous protective coating layer helps to protect the electrical components of the device from shock and the harmful effects of the surrounding external atmosphere, the protective coating layer may introduce new harmful effects to the satisfactory performance of the device. Such effects may include shrinkage of the protective coating layer upon curing or hardening resulting in harmful pressures being exerted on the electrical component. Also, if the coefficient of thermal expansion for the electrical component and the protective coating layer are not substantially equal, such as the coefficient for the protective coating layer being less than that of the components, additional harmful compressive pressures can be exerted against the electrical component during subjection to elevated temperature cycling. Thus, the electrical component would tend to expand at a faster rate than the protective coating layer when the temperature of the device was increased, thereby causing the layer to exert pressure against the component. If the coefficient of thermal expansion of the protective coating layer is greater than that of the component, the protective coating layer may exert harmful compressive pressures against the component when the temperature of the device was decreased below ambient temperatures.

The adhesive nature of the protective coating layer to the surface of the electrical component, while desirable for good protection of the electrical component by maintaining the continuous nature of the coating, can have a detrimental effect on the electrical component due to adhesion of the protective coating layer to the surface of the component during a temperature cycling which may create harmful stresses at the interface between the layer and the surface of the device. These stresses are caused by an expansion of the protective coating layer at a rate different from the expansion rate of the electrical component and the adhesion of the protective coating layer creating tensional forces at the surface of the component during temperature cycling.

Any of the above stresses may result in harmful spalling, cracking or fracturing of the protective coating layer or of the electrical component or both to relieve built up pressures. Such effects may reduce the ability of the device to withstand further temperature cycling, may harmfully affect the electrical characteristics of the device, break the seal allowing harmful atmospheric contamination or, perhaps, even be a cause of a complete failure of the device, as well as causing failure of the insulative properties of the protective layer.

A protective coating which can be readily applied, as by powder coating techniques, which eliminates or at least minimizes the above-described stresses is needed and is desired.

SUMMARY OF THE INVENTION

This invention relates to a powder coating composition and more particularly, to a powder coating composition comprising an epoxy resin.

The composition comprises at least one 1, 2 epoxy compound, a functionally terminated elastomer and a curing agent mixture. The curing agent mixture comprises an imidazoline derivative combined with an adduct of (a) a polyhydroxyl compound having a structural formula of

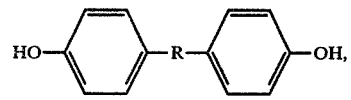

where R is a radical selected from

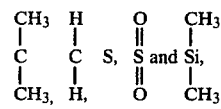

and (b) a diglycidyl ether of the polyhydroxyl compound (a), where the reactant (b) is present in a less than equimolar amount than the reactant (a).

DETAILED DESCRIPTION

We have discovered that combining at least one 1, 2 epoxy compound, a functionally terminated elastomer and a curing agent mixture of an imidazoline derivative and an adduct of (a) a polyhydroxyl compound and (b) a diglycidyl ether of the polyhydroxyl compound, the latter being present in a less than equimolar amount, leads to a powder coating composition which has the properties of good solvent resistance, long shelf life, enhanced water insensitivity, excellent high temperature electrical and mechanical properties and excellent temperature shock resistance.

A 1, 2 epoxy compound is selected. Suitable 1, 2 epoxy compounds, such as for example for powder coating applications, are compounds having at least two 1, 2 epoxy groups in the molecule and a lower melting point of more than 40° C. Compounds which correspond to this characteristic are polyepoxy compounds which are solid at 40° C. and below, including higher molecular weight compounds (so called solid resins).

The 1, 2 epoxy compounds may be either saturated or unsaturated, and they may be aliphatic, cycloaliphatic, aromatic or heterocyclic. They may furthermore contain substituents which under the conditions of mixture or reaction do not cause any undesired side reactions. Alkyl or aryl substituents, aliphatic hydroxyl groups, ether groupings and the like do not cause side reactions.

Of the solid resins those preferred for this application are 1, 2 epoxy compounds having more than one epoxy group in the molecule, whose epoxy equivalent weight is between 500 and 5,000. Included within those resins are the solid, polymeric polyglycidyl polyethers of dihydroxyl compounds having the structural formula of

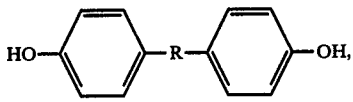
(1)

where R is a radical selected from

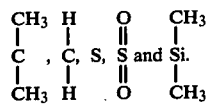

Such polyglycidyl polyethers are obtainable by reacting epichlorohydrin with the dihydroxyl compound in an alkaline medium at about 50° C. using 1 to 2 or moles of epichlorohydrin per mol of dihydroxyl compound. The heating is continued for several hours to effect the reaction, and the product is then washed free of salt and base. The product, instead of being a single simple compound, is generally a complex mixture of glycidyl polyethers, but the principal product maybe represented by the formula

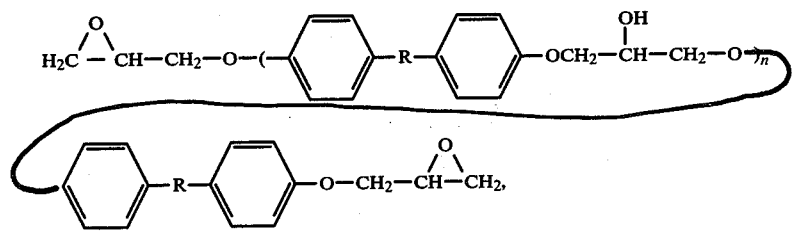
(2)

where R is as above and n is an integer of the series 0, 1, 2, 3, etc.

Preferably the glycidly polyethers are those of bisphenol A [2,2-bis-(4-hydroxyphenyl)-propane]
(where R is

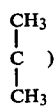
)

which are obtained, for example, by the reaction of bisphenol A with epichlorohydrin in molar ratios of 1:1.9 to 1.2 (in the presence of an alkali hydroxide in an aqueous medium). Typical epoxy resins of bisphenol A are readily available commercially and reference may be made to the *Handbook of Epoxy Resins*, by Lee and Neville for a complete description of their synthesis.

Other suitable polymeric polyepoxides are obtained through reaction of a polyglycidyl ether of bisphenol A with less than the equimolecular amount of bivalent phenol, preferably in the presence of a catalyst such as a tertiary amine, a tertiary phosphine or a quarternary phosphonium salt.

Other glycidyl ether resins that are useful and which can be used in place of or in combination with the polyhydroxyl type epoxies in this invention include polyglycidyl ethers of a novolac. The polyglycidyl ethers of a novolac suitable for use in accordance with this invention are prepared by reacting an epihalohydrin with phenol formaldehyde condensates or cresole formaldehyde condensates. While the bisphenol A based resins contain a maximum of two epoxy groups per molecule, the epoxy novolacs may contain as many as seven or more epoxy groups per molecule. As indicated above, in addition to phenol, alkyl substituted phenols such as o-cresol may be used as a starting point for the production of novolac resins.

The product of the reaction is generally an aromatic type compound, one example of which is represented by the formula:

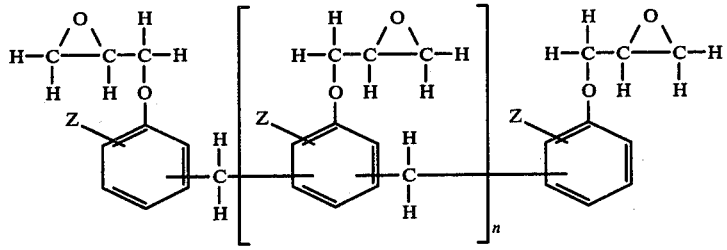
(3)

wherein Z is H or $CH_3$ and n is an integer of the series 0, 1, 2, 3, etc.

Although novolac resins from formaldehyde are generally preferred for use in this invention, novolac resins from any other aldehyde such as, for example, acetaldehyde, chloraldehyde, butyraldehyde, fufuraldehyde, can also be used. Although the above formula shows a completely epoxidized novolac, other novolacs which are only partially epoxidized can be useful in this invention.

The polyepoxide may also be a solid epoxidized polyester which has been obtained, for example, through the reaction of a polyvalent alcohol and/or a polybasic carboxylic acid or its anhydride with a low molecular polyepoxide. Examples of such polyepoxides of low molecular weight are liquid diglycidyl ether of bisphenol A, diglycidylphthalate, diglycidyladipate, diglycidyltetrahydrophthalate, diglycidylhexahydrophthalate, diglycidylmaleate and the 3,4-epoxycyclohexylmethylester of 3,4-epoxycyclohexanecarboxylic acid.

Mixtures of solid polyepoxides may also be used, such as for example a mixture of a polyepoxide whose softening point is between 120° and 160° C. and a polyepoxide having a softening point between 60° and 80° C. (softening point determined by the mercury method of Durrans).

Adduct hardeners are also suitable, in addition to the so called solid resins, for the practice of the method of the invention. Such solid adduct hardeners may be prepared, for example, from liquid polyepoxides of polyunsaturated hydrocarbons such as vinyl cyclohexene, dicyclopentadiene and the like, epoxy ethers of polyvalent alcohols and phenols, etc., and aliphatic, cycloaliphatic and aromatic diamines. For such an adduct to be suitable, its lower softening point must be above 40° C.

The glycidyl ether epoxy resins may also be characterized by reference to their epoxy equivalent weight, which is the mean molecular weight of the particular resin divided by the mean number of epoxy radicals per molecule. In the present invention, the suitable epoxy resins are characterized by an epoxy equivalent weight of from about 650 to about 900 for the bisphenol A type and from about 190 to 250 having a molecular weight of 1000 to 1400 for the epoxy novolacs. Within this range there is a preferred range of epoxy equivalent weight of from about 700 to 800 for the bisphenol A type and about 230 having a molecular weight of about 1130 to 1230 for the epoxy novolacs. These two types of epoxy resins may be used alone or in admixtures.

Combined with the 1, 2 epoxy compound or a mixture of 1, 2 epoxy compounds to form a resin component is a functionally terminated elastomer. Suitable elastomers are described in U.S. Pat. No. 3,966,837, incorporated hereinto by reference. In particular, the functionally terminated elastomer may be any of a great many types of linear polymers having a backbone of such a character that it is more or less rubbery or elastomeric at the intended temperature of service of the product, with each chain molecule containing two, or at most, a small number of groups reactive with epoxy groups. Such elastomers include functionally terminated chain polymers of various kinds, including polymers of dienes such as butadiene, chlorobutadiene or isoprene; copolymers of dienes with each other or with ethylenically unsaturated compounds, such as copolymers of butadiene with styrene, acrylonitrile or ethyl acrylate; butyl rubber; ethylenepropylene rubber; polymers of eipchlorohydrin or other polyether elastomers; polysilicones; elastomeric polyamides or polyamines; and the like, in each case with a small number, preferably two, functionally reactive groups, which are preferably the terminal groups of the chain molecule.

Suitable functionally terminated elastomers include those having hydroxyl, mercapto, carboxyl or amino groups, preferably carboxyl or phenolic hydroxyl, at or near the ends of the chain molecules. Such materials include amine terminated polyamides, such as nylon finished by reaction with a small excess of a diamine; functionally terminated polyethers such as primary amine terminated polytetramethylene oxide or polyepichlorohydrin or polyethylene oxide; mercapto terminated alkyl acrylate polymers such as copolymers of ethyl acrylate with a little butyl acrylate; carboxyl terminated liquid polymers or copolymers of butadiene or other dienes and the like. It is preferred that the functionally reactive group be carboxyl or phenolic hydroxyl groups.

Typically, the carboxyl terminated butadiene type elastomer is present in the resin component in an amount within the range of 2 to 15 weight percent, the remainder being the 1, 2 epoxy compound or mixture of 1, 2 epoxy compounds. If less than 2 weight percent is employed, then no appreciable toughening thereof occurs upon curing. If more than 15 weight percent is employed, then processing difficulties may ensue.

Combined in an amount of 3 to 25 weight percent (of the total resultant mixture) with the resin component, comprising the at least one 1, 2 epoxy compound and the functionally terminated elastomer, is a curing agent mixture. The curing agent mixture comprises a first component of an imidazoline derivative. Suitable imidazoline derivatives are described in U.S. Pat. No. 3,896,082, incorporated hereinto by reference. Specifically the imidazoline derivative is one having the general formula

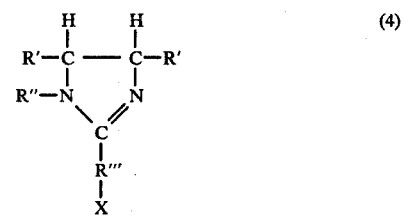

wherein R' represents hydrogen or an alkyl or aryl radical, R" represents a cycloalkyl, heterocycloalkyl or R' radical, R''' an alkyl or aryl substituted or unsubstituted alkylene or arylene radical and X represents hydrogen or a radical

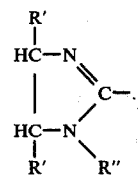

Suitable imidazoline derivatives in the meaning of the present invention which correspond to the general formula given above, are, for example, those having aryl substituted or unsubstituted alkyl radicals, those having alkyl substituted or unsubstituted aryl radicals and those which contain a secoond imidazoline group through an alkylene or arylene group. Examples are 2-methylimidazoline, 2,4-dimethylimidazoline, 2-ethylimidazoline, 2-ethyl-4-methylimidazoline, 2-benzylimidazoline, 2-phenylimidazoline, 2-(o-tolyl)-imidazoline, 2-(p-tolyl)-imidazoline, tetramethylene-bis-imidazoline, 1,1,3-trimethyl-1,4-tetramethylene- bis-imidazoline, 1,3,3,-trimethyl-1,4- tetramethylene-bis-imidazoline, 1,1,3-trimethyl- 1,4-tetramethylene-bis-4-methylimidazoline, 1,3,3-trimethyl-1,4-tetramethylene-bis-4-methylimidazoline, 1,2-phenylene-bis-imidazoline, 1,3-phenylene-bis-imidazoline, 1,4-phenylene-bis-imidazoline, 1,4-phenylene-bis-4-methylimidazoline, etc. Mixtures of the imidazoline derivatives may also be used in accordance with the invention. A preferred imidazoline is 2-phenylimidazoline.

The amount of the imidazoline derivative present in the curing agent mixture is not critical. However, if less than 0.2 weight percent is employed, then longer curing times for the resultant coating composition may be necessary. If more than 10 weight percent is employed, then cold storage conditions are required.

A second component of the curing agent mixture comprises an adduct of the polyhydroxyl compound, having the structural formula (1) above, and a diglycidyl ether of such a polyhydroxyl compound, where the latter is present in a less than an equimolar amount of the former. A preferred dihydroxyl compound is bisphenol A.

Suitable diglycidyl ethers of the polyhydroxide compounds in the curing agent mixture are those types described above for use as the 1, 2 epoxy compound. Preferred are the diglycidyl polyethers of bisphenol A.

The adduct is prepared by combining the polyhydroxyl compound, e.g., bisphenol A, with a less than molar quantity of the diglycidyl ether of polyhydroxyl compound, e.g., a diglycidyl ether of bisphenol A. To the combined reactants is added a catalyst, such as triphenyl phosphine and the resultant mixture is heated, e.g., typically at 150° C. for 4 hours, whereby an adduct is obtained, that is a solid compound having a lower melting point in excess of 40° C.

Such adducts are commercially available. Two such adducts are available from Dow Chemical Company and are known as "DOW Experimental Hardener XD-8062.00" and "DOW Experimental Hardener XD-8062.01," the latter being an accelerated version of the former. These DOW products, which are believed to be an adduct of bisphenol A and a less than equimolar amount of a diglcydidyl ether of bisphenol A, have a viscosity at 150° C. of 100 to 400 cks, a Durran softening point of 78°-90° C., an epoxide equivalent weight of 240-260, a density at 25° C. of 1.2 and a Pensky-Marten flash point of 400° F.

The amount of the adduct present in the curing agent mixture is not critical. However, if less than 90 weight percent is employed, then the storage stability of the resultant composition may be impaired. If more than 99.8 weight percent is employed, then the curing speed of the resultant coating composition may be slower than normally would be required.

EXAMPLE I

For comparison purposes a resin component was prepared by combining 68 parts by weight of a diglycidyl ether of bisphenol A, having an epoxide equivalent weight of 750 and a Durran's softening point of 92° C. (commercially obtained from Shell Chemical Company and designated as "Epon 2001"); 12 parts by weight of a diglycidyl ether of bisphenol A, having an epoxide equivalent weight of 4000 to 6000, a viscosity of Y-$Z_2$ (Gardner-Holdt at 30% non-volatile content in Dowanol DB at 25° C.) and a Durran's softening point of 165°-180° C. (commercially obtained from the Celanese Corporation and designated as "Epi-Rez 560"); 5 parts of a diglycidyl ether of bisphenol A having an epoxide equivalent weight of 230, and a Durran's softening point of 80° C. (commerically obtained from Ciba Products Company and designated as "Araldite ECN1280"); a brominated diglycidyl ether of bisphenol A having an epoxide equivalent weight of 600-750, a viscosity of $A_2$-B cps at 25° C., 40% in butyl carbitol, a Durran's softening point of 90°-100° C. and containing 42 weight percent bromine (commercially obtained from Celanese Corporation and designated as "Epi-Rez 5183"); a carboxyl terminated liquid copolymer of butadiene and acrylonitrile having an average molecular weight of about 3200, containing about 18% acrylonitrile [commerically obtained from B. F. Goodrich Company and designated as "HYCAR CTBN (1300X8)"]; and 0.15 parts of a mixed alkyl acrylate flow agent comprising a mixture of polymers of ethyl acrylate and 2-ethylhexyl acrylate (commercially obtained from Monsanto Chemical Company and designated as "Modaflow").

The resin component mixture was prereacted in the following manner. All the components except the "Epi-Rez 560" and "Modaflow" were combined and heated up to 125° C. until melting occurred. The temperature was raised to 170° C. and after an hour thereat, the "Epi-Rez 560" was added and mixed. Finally, the "Modaflow" was added. The mixture was then heated at 170° C. for 15 minutes and then cooled.

The cooled reaction component was then combined with a curing agent comprising 6.25 weight percent of 2-phenyl imidazoline (commercially obtained from Veba-Chemie AG) and comminuted to form a powder having an average particle size of 55μm.

A portion of the powder was applied to a varistor using a conventional powder coating technique, and the powdered varistor was then heated at 170° C. for 10 minutes to form a fully cured dielectric coated varistor, the full curing being evidenced by good thermal cycling capability and resistance to solvent attack. The coated varistor was then put into a conventional stripping apparatus for removing the dielectric coating from the leads of the varistor. The dielectric coating exhibited poor strippability from the leads and is considered unsatisfactory as a component coating in that respect.

The coated varistor was inserted in a commercially obtained thermal cycling chamber which goes through a thermal cycle of −40° C. to +65° C. and back to −40° C. in 1.5 hours. After 12 cycles there was a failure in that a thermal stress crack appeared on the coated varistor.

A portion of the powder was then examined to determine the rate of cure. The rate of cure is reflected by the gell time at 200° C. The powder gelled after 37-38 seconds.

The shelf life of the resultant powder was then determined by measuring the initial glass plate flow length at 150° C. and the glass plate flow length at 150° C. at regular intervals. The glass plate flow length value is the value obtained with a procedure where 0.2 gm. of the dielectric powder is pressed into a 0.6 cm. diameter pellet at a pressure of 2,000 pounds for several minutes, e.g., ten minutes, using a conventional pelleting apparatus. The pellet is then placed at a 45° angle on a hospital grade glass microscope plate (as sold by Fisher Company and designated as "Fisher Brand Microslide") maintained in an oven at the particular temperature, e.g., 150° C. The flow length value can be determined at any temperature between the melting point and the decomposition temperature of the thermosetting powder. The pellet at first melts and tends to flow until it sets again. The flow length is the total length observed for the polymeric material minus the pellet's initial diameter (0.6 cm.).

The initial glass plate flow value was 3.2 cm. and the value after 2 months at an ambient temperature of about 23° C. was 0.8 cm.

EXAMPLE II

For comparison purposes, the procedure of EXAMPLE I was repeated except that the curing agent comprised 21.92 parts by weight of an adduct of bisphenol A and a less than equimolar amount of a diglycidyl ether of bisphenol A, having an epoxide equivalent weight of 240–260, a viscosity at 150° C. of 100–400 cks, a Durran's softening point of 78°–90° C., a density at 25° C. of 1.2 g/cm³ and a Pensky-Marten flash point of 400° F. (commercially obtained from Dow Chemical Company and designated as "DOW Experimental Hardener XD-8062.01").

A varistor was coated with the powder having an average particle size of approximately 55 μm which was fully cured at 170° C. for 10 minutes.

The coated varistor was subjected to the thermal cycling test and a thermal shock stress crack was obtained after 10 cycles.

The gel time obtained was 26–30 seconds.

The initial flow length value was 4.1 cm. and the flow length value after 8 months at an ambient temperature of about 23° C. was 1.8 cm.

EXAMPLE III

The procedure of EXAMPLE I was repeated except that the curing agent comprised a mixture of 6.28 parts by weight (5.73 percent by weight) of 2-phenyl imidazoline and 3.17 parts by weight (2.90 percent by weight) of the adduct of EXAMPLE II.

A varistor was coated with the resultant power (average particle size of 55 μm) and the coating fully cured at 170° C. after 10 minutes. The resultant dielectric coating was easily stripped from the leads of the varistor.

A thermal shock crack was observed after 18 cycles. The composition had a gel time at 200° C. of 30–31 seconds. An initial glass plate value at 150° C. of 2.7 cm. and a glass plate value at 150° C. after 2 months at an ambient temperature of about 23° C. of 0.8 cm. was obtained.

EXAMPLE IV

The procedure of EXAMPLE III was repeated except that 3.49 parts by weight (2.92 percent by weight) of the 2-phenyl imidazoline and 15.86 parts by weight (13.27 percent by weight) of the adduct were employed. A fully cured varistor coating was obtained which was easily strippable from the leads thereof. The coating went through 208 cycles before exhibiting a thermal stress crack. The powder had a gel time at 200° C. of 18–22 seconds, an initial flow value at 150° C. of 2.8 cm. and a flow value at 150° C. of 1.3 cm. after 2 months at an ambient temperature of about 23° C.

EXAMPLE V

The procedure of EXAMPLE III was repeated except that the curing agent mixture comprised 2.65 parts by weight of 2-phenyl imidazoline and 12.65 parts by weight of the adduct. A fully cured varistor coating was obtained which went through 450 cycles before exhibiting a thermal stress crack. The powder had a gel time of 26–29 seconds at 200° C., an initial glass plate flow value at 150° C. of 2.4 cm. and a glass plate flow value at 150° C. of 1.0 cm. after 2 months at an ambient temperature of about 23° C.

It is to be understood that the above-described embodiments are simply illustrative of the principles of the invention. Various other modifications and changes may be made by those skilled in the art which will embody the principles of the invention and fall within the spirit and scope theof.

What is claimed is:

1. A powder coating composition which comprises:
   at least one 1, 2 polyepoxy compound;
   a functionally terminated elastomer;
   a curing agent mixture comprising (1) an imidazoline derivative having the structural formula of

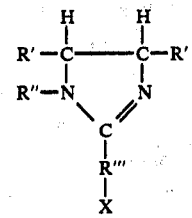

wherein
R' is selected from the group of hydrogen, alkyl and aryl;
R'' is selected from the group of cycloalkyl, heterocycloalkyl and R';
R''' is selected from the group of alkylene and arylene and the foregoing substituted by alkyl and/or aryl; and
X is hydrogen or the radical

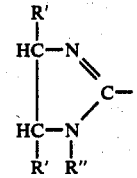

wherein R' and R'' are as defined previously and (2) an adduct of (a) a polyhydroxyl compound having a structural formula of

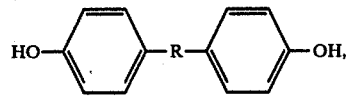

where R is selected from the group consisting of

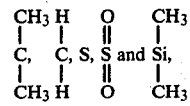

and (b) a diglycidyl ether of said polyhydroxyl compound (a), where reactant (b) is present in less than an equimolar amount to reactant (a).

2. The composition as defined in claim 1 wherein said 1, 2 polyepoxy compound comprises a diglycidyl ether of bisphenol A.

3. The composition as defined in claim 2 wherein said functionally terminated elastomer is selected from the group consisting of an elastomer having terminal phenolic hydroxyl groups, an elastomer having terminal carboxyl groups and a mixture of the foregoing.

4. The composition as defined in claim 3 wherein said elastomer comprises a carboxyl terminated copolymer of a major proportion of butadiene and a minor proportion of acrylonitrile.

5. The composition as defined in claim 4 wherein said imidazoline is selected from the group consisting of 2-methylimidazoline, 2,4-dimethylimidazoline, 2- ethylimidazoline, 2-ethyl-4-methylimidazoline, 2-benzylimidazoline, 2-phenylimidazoline, 2-(o-tolyl)-imidazoline, 2-(p-tolyl)-imidazoline, tetramethylene-bis-imidazoline, 1,1,3-trimethyl-1,4-tetramethylene-bis-imidazoline, 1,3,3-trimethyl-1,4-tetramethylene-bis-imidazoline, 1,1,3-trimethyl-1,4-tetramethylene-bis-4-methylimidazoline, 1,3,3-trimethyl-1,4-tetramethylene-bis-4-methylimidazoline, 1,2-phenylene-bis-imidazoline, 1,3-phenylene-bis-imidazoline, 1,4-phenylene-bis-imidazoline and 1,4-phenylene-bis-4-methylimidazoline.

6. The composition as defined in claim 5 wherein said imidazoline comprises 2-phenylimidazoline.

7. The composition as defined in claim 6 wherein said adduct is of bisphenol A and a diglycidyl ether of bisphenol A.

8. An electrical device which comprises:

an electronic component means; and a dielectric protective coating on said electronic component means, said coating comprising:

at least one 1, 2 polyepoxy compound;

a functionally terminated elastomer;

a curing agent mixture comprising (1) an imidazoline derivative having the structural formula of

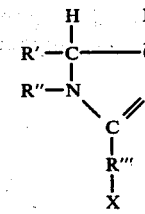

wherein

R' is selected from the group of hydrogen, alkyl and aryl;

R" is selected from the group of cycloalkyl, heterocycloalkyl and R';

R''' is selected from the group of alkylene and arylene and the foregoing substituted by alkyl and/or aryl; and X is hydrogen or the radical

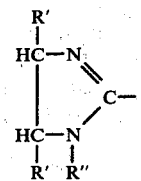

wherein R' and R" are as defined previously and (2) an adduct of (a) a polyhydroxyl compound having a structural formula of

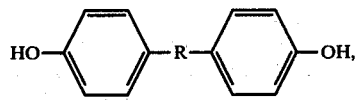

where R is selected from the group consisting of

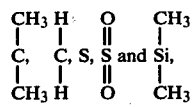

and (b) a diglycidyl ether of said polyhydroxyl compound (a), where reactant (b) is present in less than an equimolar amount to reactant (a).

9. The composition as defined in claim 8 wherein said 1, 2 polyepoxy compound comprises a diglycidyl ether of bisphenol A.

10. A composition as defined in claim 9 wherein said functionally terminated elastomer is selected from the group consisting of an elastomer having terminal phenolic hydroxyl groups, an elastomer having terminal carboxyl groups and a mixture of the foregoing.

11. The composition as defined in claim 10 wherein said elastomer comprises a carboxyl terminated copolymer of a major proportion of butadiene and a minor proportion of acrylonitrile.

12. The composition as defined in claim 11 wherein said imidazoline is selected from the group consisting of 2-methylimidazoline, 2,4-dimethylimidazoline, 2-ethylimidazoline, 2-ethyl-4-methylimidazoline, 2-benzylimidazoline, 2-phenylimidazoline, 2-(o-tolyl)-imidazoline, 2-(p-tolyl)-imidazoline, tetramethylene-bis-imidazoline, 1,1,3-trimethyl-1,4-tetramethylene-bis-imidazoline, 1,3,3-trimethyl-1,4-tetramethylene-bis-imidazoline, 1,1,3-trimethyl-1,4-tetramethylene-bis-4-methylimidazoline, 1,3,3-trimethyl-1,4-tetramethylene-bis-4-methylimidazoline, 1,2-phenylene-bis-imidazoline, 1,3-phenylene-bis-imidazoline, 1,4-phenylene-bis-imidazoline and 1,4-phenylene-bis-4-methylimidazoline.

* * * * *

UNITED STATES PATENT OFFICE
CERTIFICATE OF CORRECTION

PATENT NO. : 4,176,142
DATED : November 27, 1979
INVENTOR(S) : R. B. Lewis and T. A. Giversen It is certified that error appears in the above-identified patent and that said Letters Patent are hereby corrected as shown below:

In the title page, column 1, references cited, "Klarem et al." should read --Klaren et al.--; also the following references should have been cited:

| | | | |
|---|---|---|---|
| 3,678,130 | 7/1972 | Klapprott | 260/836 |
| 3,686,359 | 8/1972 | Soldatos | 260/836 |
| 3,707,583 | 12/1972 | McKown | 260/836 |
| 3,770,698 | 11/1973 | Riew | 260/837R |
| 3,823,107 | 7/1974 | Cotton | 260/836 |
| 3,855,176 | 12/1974 | Skidmore | 260/836 |
| 3,894,112 | 7/1975 | Pagel | 260/837R |
| 3,894,113 | 7/1975 | Pagel | 260/837R |
| 3,926,903 | 12/1975 | Scola | 260/837R |
| 3,926,904 | 12/1975 | Scola | 260/837R |
| 3,966,837 | 6/1976 | Riew | 260/836 |

In the specification, column 3, line 57, "glycidly" should read --glycidyl--. Column 6, line 1, "group" should read --groups--; line 51, "secoond" should read --second--.

Signed and Sealed this

Twenty-fifth Day of March 1980

[SEAL]

Attest:

SIDNEY A. DIAMOND

Attesting Officer        Commissioner of Patents and Trademarks